United States Patent Office 2,841,498
Patented July 1, 1958

2,841,498

COLD WATER-SOLUBLE GELATIN COMPOSITION AND METHOD OF PREPARING THE SAME

Frank J. Cahn, Los Angeles, and Elliot B. Hagerty, Whittier, Calif., assignors to Louis Milani Foods, Inc., Los Angeles, Calif., a corporation of Illinois No Drawing. Application October 19, 1955
Serial No. 541,543

2 Claims. (Cl. 99—130)

The instant invention relates to powders for preparing gelatin-containing desserts, salads, and the like. More particularly, it relates to gelatin-containing powders which are readily soluble in water at room temperature.

Powdered food products containing gelatin, sugar, fruit flavoring, and artificial coloring are widely used in preparing salads, desserts, and the like. The conventional commercially available gelatin-containing powder must be dissolved in hot water and stored in a refrigerator or cooled until the resulting solution sets to a gel. Generally the dessert is not ready to be served for about four hours. A quicker method of inducing gelation involves the addition of ice cubes to the solution and stirring until it begins to set. The solution is then stored in a refrigerator until it gels and can be served after about one hour.

There are several disadvantages in the manner of preparation of the conventional gelatin desserts, salads, and the like. The necessity of dissolving the gelatin-containing flavored powder in hot water results in a certain loss of the volatile fruit flavor and aroma. Such loss of flavor and aroma could be minimized and a more appetizing food product obtained if the gelatin dessert powder were capable of dissolving in cold water. However, the commercially available gelatins for preparing desserts and salads are not soluble in cold water.

The solutions prepared by dissolving the gelatin dessert powders which are presently on the market also require substantial periods for gelation, even under refrigeration. A gelatin solution which would set more rapidly than those of conventional preparations would possess obvious merit for those people who are not at home during the day to prepare the gelatin-containing salad or dessert in advance.

Gelatin products which dissolve in cold water are disclosed in U. S. Patent 2,166,074 issued to Reichel. This product is a porous, friable mass obtained by freezing an aqueous solution of gelatin and then subliming the ice from the frozen material under an almost perfect vacuum and at a very low temperature. This product is not commercially available because the process is tedious and the cost of manufacture is too great to produce a gelatin product which would be economically competitive with those on the market.

Expired U. S. Patent 1,735,356 states that a solution of gelatin, with or without associated substances such as sugar, may be spray dried, but the necessary conditions are not revealed, and there is no indication therein that the spray dried product differs from ordinary gelatin in any particular other than bulkiness.

We have now discovered that gelatin-containing powders which differ from previously-known spray dried gelatin compositions, in that they quickly dissolve in cold water to yield a fluid which sets to a gel at room temperature, can be prepared by spray drying aqueous solutions of sucrose and gelatin, provided that the sucrose content thereof is at least eight times, and preferably of the order of nine or ten times, the gelatin content. The products of our new processes are new articles of manufacture consisting of small particles of the same order of magnitude as the particles in ordinary commercial gelatin dessert powders. The particles comprising our new products appear to be solidified solutions of gelatin in sucrose and water with or without added flavoring and coloring.

Accordingly, it is a principal object of the instant invention to provide a gelatin-containing powder for preparing desserts, salads, and the like which is soluble in cold water.

It is a further object of the instant invention to provide a gelatin-containing powder for preparing desserts, salads, and the like, the solutions of which gel more rapidly than those heretofore available.

It is a further object of the instant invention to provide commercially feasible processes for the production of improved gelatin-containing powders for the preparation of desserts, salads, and the like.

These and other objects of the instant invention will become apparent from the following description.

In its broad aspect, the instant invention includes a process in which a gelatin-containing powder for use in the preparation of gelatin desserts, salads, and the like is produced by spray drying an aqueous solution containing at least eight times as much sucrose as gelatin. Utilization of this process results in a gelatin-containing powder which is readily soluble in cold water and which sets more rapidly than solutions of conventional gelatins.

The ratio of sugar to gelatin in the solution which is subjected to spray drying may be varied over a wide range, provided it is never less than eight. The actual ratio employed in any given case of course will be affected by the sweetness desired in the product. Where desired, a dry saccharine material such as sucrose, dextrose, or corn syrup solids may be mixed with the spray dried gelatin-sucrose powder in the formulation of the dessert powder in commercial form.

The quantity of water used in preparing the gelatin-sugar solution is generally that amount just sufficient to completely dissolve the gelatin and the sugar, and to produce a homogeneous solution. However, larger amounts of water may be added if desired. A solution of between about 35% and about 75% by weight solids content can be employed. The solution may be heated in order to minimize the quantity of water necessary for the solution of the sugar and the gelatin.

A small amount of edible solid acid such as citric acid, tartaric acid, or mixtures thereof, which impart a tart flavor to the product, artificial fruit flavor and coloring material may also be incorporated into the aqueous gelatin solution before spray drying. Fugitive flavors however should not be introduced into the solution before drying, but should be mixed with the spray dried product after it has cooled. The amounts of these materials used depends upon the type of flavor and color desired in the product and is a matter of choice.

The aqueous solution of gelatin and sugar, with or without acid, artificial flavoring and coloring is dehydrated by spray drying. For example, water can be removed according to well known methods in conventional spray drying apparatus. The powder which is obtained from the spray drying step is soluble in the conventional amount of water used for dissolving gelatin-containing powders in the preparation of desserts, salads, and the like. However, unlike ordinary gelatin-containing products, the instant product readily dissolves in cold or ordinary tap water, thus eliminating the step of heating water for dissolving the gelatin; and in addition provides a product which retains all of its original appetizing fruit aroma and flavor. Furthermore, the solution of the gelatin-containing powder in cold water gels within between about 7 and about 15 minutes when cooled to about 32° F., and a solution at 75° F. when placed in an ordinary kitchen refrigerator sets to a firm gel therein in about 1½ hours.

In a preferred embodiment of the instant invention, a mixture containing between about 8.5 and about 9.0 parts of sucrose, about 1 part of gelatin, between about 0.1 and about 0.2 part of citric acid, and a small amount, for example, between about 0.02 and about 0.025 part of artificial fruit flavor, such as cherry, orange, lemon or the like, together with appropriate artificial food color, is dissolved in sufficient boiling water to produce a solution of between about 40% and about 55% solids content. The resulting solution is dehydrated by spray drying to obtain a powder.

The spray drying is carried out in any apparatus for this purpose. For example, the solution is dried in a cylindrical chamber having a nozzle near the center at its top from which the gelatin-containing liquid is sprayed under pressure. Hot dry air is admitted near the top, and the cooler air exits at the bottom of the chamber. If desired, the gelatin-containing stream in the spray dryer is encircled by a current of cool air moving in the same direction. In this embodiment, the spray drying chamber is equipped with air ducts on the periphery of the spray drying cone from which cold air blasts out near and parallel to the wall of the dryer, and in a downward direction. This embodiment minimizes the amount of material adhering to the wall of the chamber.

The gelatin-sugar solution introduced to the dryer preferably is at a temperature of about 50° to about 70° C. The powder obtained from the spray drying step generally has a moisture content between about 3.5% and about 5.5%. If a lower moisture content is desired, the powder obtained by removal of water in the spray dryer can be subjected to further drying by any convenient method. For example, the powder is contacted with hot dry air by one of the conventional procedures.

The spray dried gelatin-containing powder dissolves in about 5.6 parts of cold water per part of gelatin dessert powder. When a portion of the resulting solution is chilled in an ice bath, it usually sets within about 7 to about 15 minutes. The resulting gel has the appearance, gel strength, taste, and flavor of a conventional gelatin-containing food product.

The following examples are given for the purpose of illustration of the invention, but there is no intention that the invention be limited thereto.

I

About 60 lbs. of a composition containing about 89.7% sucrose, 10% gelatin, 0.22% cherry flavor, and 0.0775% red food coloring was dissolved in about 11 gallons of boiling water. The resulting solution had a solids content of about 41.4% by weight, and a temperature of about 60° C. This solution was then spray dried in a stainless steel cylindrical drying chamber having a height of about 50 feet and a diameter of about 8 feet. In the middle of the cylinder near its top was a nozzle from which the liquid, under a pressure of about 225 lbs. per square inch, was sprayed at a rate of about 35 gallons per hour. The air inlet temperature was about 243° C., and the air exit temperature was about 124° C.

The gelatin dessert powder obtained from the spray drying step had an apparent specific gravity of about 0.58 and a moisture content of about 4.4% by weight. About 43 grams of the product was dissolved in about 240 cc. of water at a temperature of about 20° C. A portion of the resulting solution was placed in a container which was placed in an ice bath. The solution set to a gel in between about 7 and about 10 minutes. The product had the appearance, gel strength, flavor and eating properties of gelatin dessert without its tartness due to the omission of acid from the composition. If desired, the spray dried powder may be mixed with a dry edible acid to produce a tart flavor in the product.

II

About 60 lbs. of a composition containing about 87.9% by weight of sucrose, 1.7% citric acid, 10% gelatin, 0.22% cherry flavor, and 0.077% of red food color was mixed with about 76 lbs. of boiling water. The resulting solution had a temperature of about 60° C. and a solids content of about 44.2% by weight. This solution was spray dried in the apparatus and under the conditions employed in Example I. The product was a free flowing powder having an apparent specific gravity of about 0.61 and a moisture content of about 4.6% by weight. About 43 grams of this powder was dissolved in about 240 cc. water having a temperature of about 20° C. A portion of the resulting solution was transferred to a container which was placed in ice water. The solution set to a gel in between about 7 and about 10 minutes. The resulting gel had the appearance, gel strength, taste, flavor and eating properties of conventional cherry gelatin dessert.

III

A gelatin-sugar solution containing citric acid, fruit flavoring, and coloring material was prepared as described in Example II except that sufficient water was added to obtain a solution of about 20.8% by weight solids content. This solution was spray dried as described in Example I. The liquid leaving the nozzle had a pressure of about 450 lbs. per square inch. The temperature of the air at the inlet was about 260° C., and the air at the exit about 122° C. The resulting product lacked the free flowing properties of the products obtained in Examples I and II. About 43 grams of the product was dissolved in about 240 cc. of tap water and when cooled set to a gel.

IV

About 100 lbs. of a gelatin-sugar solution containing citric acid, cherry flavor, and artificial food color was prepared as described in Example II, except that about 82 lbs. of water was used, thereby making a solution of about 56.2% by weight solids content. This solution was spray dried as described in Example I. The liquid leaving the nozzle had a pressure of between about 450 and about 500 lbs. per square inch. The temperature of the air at the inlet was about 260° C., and the air at the exit was about 135° C.

The resulting product was a free flowing powder having an apparent specific gravity of about 0.60 and a moisture content of about 5.5% by weight. About 43 grams of this powder was dissolved in about 240 cc. water at a temperature of about 20° C. After gelation, the resulting product had the appearance, gel strength, and flavor of a conventional gelatin dessert.

Having thus fully described and illustrated the nature of the instant invention, what is claimed is:

1. A process for preparing a powder for incorporation into gelatin-containing foodstuffs capable of dissolving in cold water to form liquids from which a transparent gel is obtained at room temperatures, which process consists in spraying an aqueous solution containing about 2 parts of gelatin and sugar in about 3 parts of water wherein the weight ratio of sugar to gelatin is between 8:1 and 10:1, under a pressure of about 225 lbs. per square inch at a rate of about 35 gallons per hour downwardly into a downwardly moving current of air heated to between 124° C. and 243° C. and surrounded by a jacket of downwardly moving cool air, thereby producing a sensibly dry powder having a moisture content between 4% and 5% by weight and an apparent specific gravity of about 0.6.

2. The product of the process of claim 1, consisting of small edible particles containing gelatin, 8 to 10 parts of sucrose for each part of gelatin, and about 5% moisture by weight, which product is soluble in 5 to 6 parts of cold water to form a liquid which sets in from 7 to 15 minutes at 0° C. to yield an edible transparent gel.

References Cited in the file of this patent

UNITED STATES PATENTS

| | | |
|---|---|---|
| 4,084 | Cooper | June 20, 1845 |
| 1,735,356 | Neff | Nov. 12, 1929 |

FOREIGN PATENTS

| | | |
|---|---|---|
| 10,147 | Great Britain | 1900 |
| 596,731 | Great Britain | Jan. 9, 1948 |